(12) United States Patent
Park et al.

(10) Patent No.: US 12,008,458 B2
(45) Date of Patent: Jun. 11, 2024

(54) METHOD AND APPARATUS FOR VISUALIZING HEALTH STATUS INFORMATION BY USING HEALTH SPACE MODEL

(71) Applicant: SEOUL NATIONAL UNIVERSITY R&DB FOUNDATION, Seoul (KR)

(72) Inventors: Tae Sung Park, Seoul (KR); Cheol Gyun Park, Seoul (KR); Chan Hee Lee, Seoul (KR); O Ran Kwon, Seoul (KR); Yun Soo Kim, Suwon-si (KR); Eun Ok Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/880,162

(22) Filed: Aug. 3, 2022

(65) Prior Publication Data

US 2023/0030787 A1    Feb. 2, 2023

Related U.S. Application Data

(63) Continuation of application No. PCT/KR2022/007728, filed on May 31, 2022.

(30) Foreign Application Priority Data

Aug. 2, 2021   (KR) ........................ 10-2021-0101391

(51) Int. Cl.
*G06N 3/04*     (2023.01)
*G06N 3/045*    (2023.01)
(Continued)

(52) U.S. Cl.
CPC ............. *G06N 3/045* (2023.01); *G06N 3/047* (2023.01); *G06N 7/01* (2023.01)

(58) Field of Classification Search
None
See application file for complete search history.

(56) References Cited

U.S. PATENT DOCUMENTS

2021/0118574 A1    4/2021   Peri et al.
2023/0111911 A1*   4/2023   Druck ................... G06Q 10/10
                                                              715/234

FOREIGN PATENT DOCUMENTS

JP          6779205       11/2020
JP        2021051641       4/2021
(Continued)

OTHER PUBLICATIONS

Tommy Dang, Visualizing Multidimensional Health Status of Data Centers (Apr. 24, 2019), Texas Tech University, pp. 273-282 (Year: 2019).*

(Continued)

*Primary Examiner* — Belix M Ortiz Ditren
(74) *Attorney, Agent, or Firm* — CANTOR COLBURN LLP

(57) ABSTRACT

An apparatus for visualizing a health status information of each individual by using a health space model includes a memory storing a health status information visualization program, and a processor configured to execute the visualization program. The visualization program inputs multidimensional data on the health status of each individual to the health space model to visually display a position of each individual in a two-dimensional health space, the health space model includes a first ordinal regression deep neural network model for outputting a first health status value based on multidimensional data of a first group and a second ordinal regression deep neural network model for outputting a second health status value based on multidimensional data of a second group, and the visualization program displays the health status information in a two-dimensional health space.

10 Claims, 4 Drawing Sheets

(51) Int. Cl.
    *G06N 3/047*     (2023.01)
    *G06N 7/01*     (2023.01)

(56) References Cited

FOREIGN PATENT DOCUMENTS

| KR | 20170061223 | 6/2017 |
|----|-------------|--------|
| KR | 20180062353 | 6/2018 |
| KR | 102254481   | 5/2021 |
| WO | 2020111109  | 6/2020 |

OTHER PUBLICATIONS

Bouwman et al., Visualization and identification of health space, based on personalized molecular phenotype and treatment response to relevant underlying biological processes, BMC Medical Genomics, 2012, vol. 5, No. 1.

Kim et al., A Machine Learning Algorithm for Quantitatively Diagnosing Oxidative Stress Risks in Healthy Adult Individuals Based on Health Space Methodology: A Proof-of-Concept Study Using Korean Cross-Sectional Cohort Data, Antioxidants, 2021, vol. 10.

* cited by examiner

Method and Apparatus for Visualizing Health Status Information by Using Health Space Model

BACKGROUND

1. Technical Field

The present disclosure relates to an apparatus and a method for visualizing health status information using a health space model.

2. Related Art

Recently, interest in health information of each individual has increased, and interest in technology for collecting health status information and processing and visualizing the information by using a statistical technology has increased.

According to the conventionally known statistical model-based health status visualization technology (Bouwman, Jildau, et al. "Visualization and identification of health space, based on personalized molecular phenotype and treatment response to relevant underlying biological processes." BMC medical genomics 5.1 (2012): 1.), an individual's health status may be expressed as a vector of a two-dimensional space or a three-dimensional space. Therefore, by using this, a change in health status of a group and a current health status of an individual may be objectively expressed. The methodology used in this study is called a health space, and the health space may be designed in various statistical models. Therefore, in order to provide the most effective health space, it is an important issue to select one of various statistical models well.

On the other hand, as a technology develops, biometric information that may be collected from each individual has become very diverse, and a health status of each individual may be analyzed in various aspects by using the various biometric information collected in this way. However, it is difficult for an individual to understand all such biometric information, and thus, it is very important to integrate/summarize biometric information indicating various health conditions and deliver the biometric information to the individual. In order to solve the problem, various machine learning methods have been developed, and the present inventor has developed a methodology that may accurately and quantitatively measure an individual's health status by using an advanced statistical methodology.

In the present disclosure, a health space model is constructed by using a deep learning model considering ordinal data, and through this, a health status of each individual is more accurately expressed compared to other technologies.

An example of related art includes Korea Patent Publication No. 10-2254481 (Title of the invention: METHOD FOR ESTIMATING MENTAL HEALTH AND PROVIDING SOLUTION FOR MENTAL HEALTH BY LEARNING PSYCHOLOGICAL DATA AND PHYSICAL DATA BASED ON MACHINE LEARNING AND MENTAL HEALTH ESTIMATING DEVICE USING THE SAME)

SUMMARY

In order to solve the problems of the related art described above, the present disclosure provides a visualization apparatus and a visualization method that may visualize health status information of each individual by using an ordinal regression deep neural network model.

However, the technical objects to be achieved by the present embodiments are not limited to the technical object described above, and there may be other technical tasks.

According to one aspect of the present disclosure, an apparatus for visualizing a health status information of each individual by using a health space model includes a memory storing a health status information visualization program, and a processor configured to execute the health status information visualization program stored in the memory. The health status information visualization program inputs multidimensional data on the health status of each individual to the health space model to visually display a position of each individual in a two-dimensional health space, the health space model includes a first ordinal regression deep neural network model for outputting a first health status value based on multidimensional data of a first group and a second ordinal regression deep neural network model for outputting a second health status value based on multidimensional data of a second group, and the health status information visualization program displays the health status information of each individual in a two-dimensional health space by causing the first health status value to correspond to a first axis and the second health status value to correspond to a second axis.

According to another aspect of the present disclosure, a method of visualizing health status information by using an apparatus for visualizing health status information includes receiving multi-dimensional data on a health status of a target person, inputting the received multidimensional data on the health status to a health space model, outputting a first health status value as an output for multidimensional data of a first group by a first ordinal regression deep neural network model included in the health space model, and a second health status value as an output for multidimensional data of a second group by a second ordinal regression deep neural network model, and displaying the first health status value corresponding to a first axis and the second health status value corresponding to a second axis.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Figure 1:
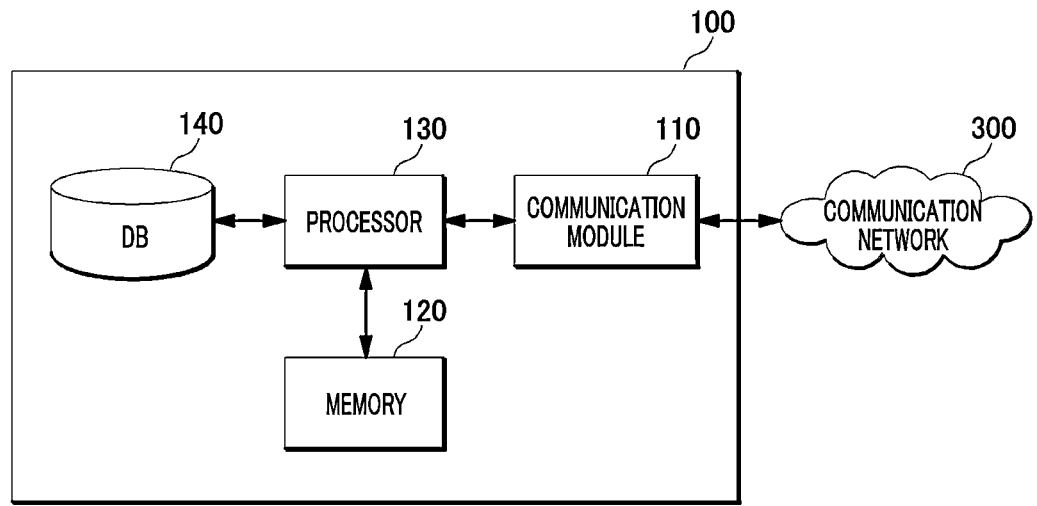
FIG. 1 is a block diagram illustrating a configuration of an apparatus for visualizing health status information according to an embodiment of the present disclosure.

Hereinafter, embodiments of the present application will be described in detail with reference to the accompanying drawings such that those skilled in the art to which the present belongs may easily implement the embodiments.

However, the present application may be implemented in several different forms and is not limited to the embodiments described herein. In order to clearly describe the present application, parts irrelevant to the description are omitted in the drawings, and similar reference numerals are attached to similar parts throughout the specification.

Throughout the present application, when a portion is "connected" to another portion, this includes not only a case in which the portion is "directly connected" thereto but also a case in which the portion is "electrically connected" thereto with another portion interposed therebetween.

Throughout the present application, when it is described that a member is located "on" another member, this includes not only a case in which the member is in contact with another member but also a case in which there is another member between the two members.

Hereinafter, embodiments of the present disclosure will be described in detail with reference to the accompanying drawings.

FIG. 1 is a block diagram illustrating a configuration of an apparatus for visualizing health status information according to an embodiment of the present disclosure.

As illustrated in FIG. 1, an apparatus 100 for visualizing health status information may include a communication module 110, a memory 120, a processor 130, and a database 140.

The apparatus 100 for visualizing health status information may operate as a server that receives multidimensional data on a health status of each individual from a terminal of each user and provides a health status classification result therefrom. In this case, the apparatus 100 for visualizing health status information may operate in a cloud computing service model such as a software as a service (SaaS), a platform as a service (PaaS), or an infrastructure as a service (IaaS). In addition, the apparatus 100 for visualizing health status information may be constructed in a form such as a private cloud, a public cloud, or a hybrid cloud.

The communication module 110 may receive various types of data on a health status from an external device and may receive biometric information collected by various medical measurement devices or various types of health data input by terminal of respective users through a communication network 300. In addition, the communication module 110 may receive update information, such as a health status information visualization program, from various external devices (servers or terminals) and transmit the received information to the processor 130.

The communication module 110 may be a device including hardware and software necessary for transmitting and receiving signals such as a control signal or a data signal through wired/wireless connection with other network devices.

The memory 120 stores a health status information visualization program for classifying and visualizing a health status based on multidimensional data on a health status of each individual. The memory 120 stores an operating system for driving the apparatus 100 for visualizing health status information or various types of data generated during execution of a health status information visualization program.

In this case, the health status information visualization program inputs multidimensional data on a health status of each individual to a health space model and visually displays a position of each individual in a two-dimensional or three-dimensional health space. A problem of dimension reduction represented by converting p-dimensional data into smaller and easier-to-interpret k-dimensional data is solved, and visualization may be made when k=2 or 3, and thus, a health state of each individual may be visualized therethrough.

In this case, the health space model may include a first ordinal regression deep neural network model for outputting a first health status value based on multidimensional data of a first group and a second ordinal regression deep neural network model for outputting a second health status value based on multidimensional data of a second group. Through this, visualization processing on health status information of each individual may be performed in a two-dimensional health space.

When the health space model further includes a third ordinal regression deep neural network model for outputting a third health status value based on multidimensional data of ae third group, visualization processing on a health status information of each individual may be performed in a three-dimensional health space. Specific content of the health status information visualization program will be described below.

In this case, the memory 120 collectively refers to a non-volatile storage device that continuously maintains the stored information even when power is not supplied, and a volatile storage device that requires power to maintain the stored information.

In addition, the memory 120 may perform a function of temporarily or permanently storing data processed by the processor 130. Here, the memory 120 may include magnetic storage media or flash storage media in addition to the volatile storage device that requires power to maintain the stored information, but the scope of the present disclosure is limited thereto.

The processor 130 may execute a program stored in the memory 120 and may perform a process of constructing a health space model according to execution of a health status information visualization program or classify a user's health status from a user's input data by using the constructed health space model and may visually display a user's position.

The processor 130 may include all kinds of devices capable of processing data. For example, the processor 130 may refer to a data processing device that is embedded in hardware and includes a physically structured circuit to perform a function represented as a code or an instruction included in a program. For example, the data processing device embedded in hardware may include a microprocessor, a central processing unit (CPU), a processor core, a multiprocessor, an application-specific integrated circuit (ASIC), and a field programmable gate array (FPGA), but the scope of the present disclosure is not limited thereto.

The database 140 stores or provides data necessary for the apparatus 100 for visualizing health status information under the control of the processor 130. The database 140 may be included as a component separate from the memory 120 or may also be constructed in a region of the memory 120.

Figure 2:
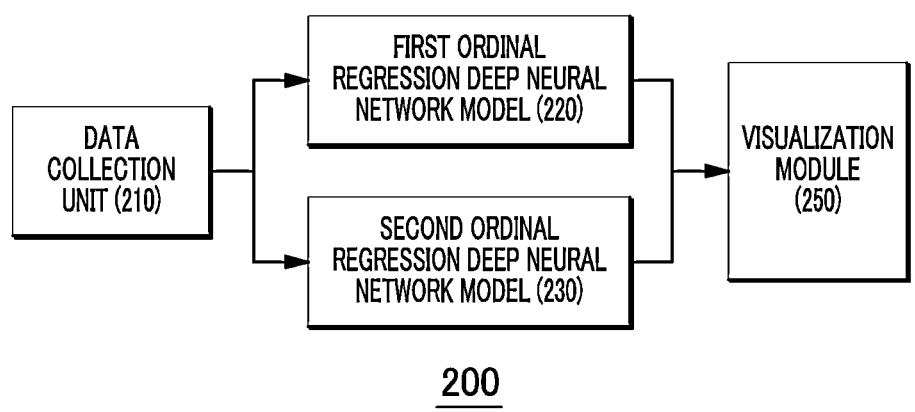
FIGS. 2 and 3 are block diagrams illustrating configurations of a health space model included in a health status information visualization program, according to embodiments of the present disclosure.
Figure 3:
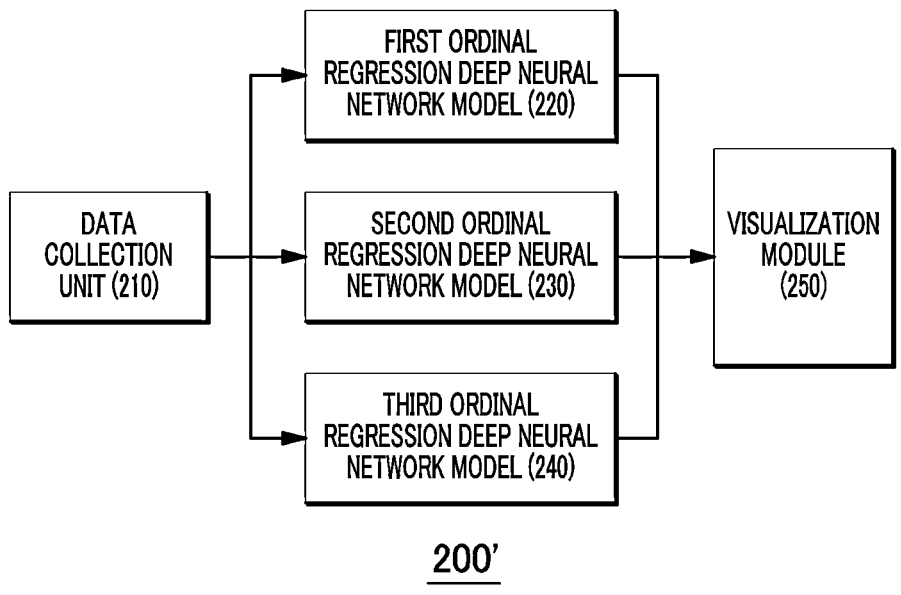

FIGS. 2 and 3 are block diagrams illustrating configurations of a health space model included in a health status information visualization program, according to embodiments of the present disclosure.

First, a health space model 200 illustrated in FIG. 2 includes a data collection unit 210, a plurality of ordinal regression deep neural network models 220 and 230, and a visualization module 250, and a health space model 200' illustrated in FIG. 3 includes the data collection unit 210, a plurality of ordinal regression deep neural network models 220 to 240, and the visualization module 250.

The data collection unit 210 receives multidimensional data on a health status of each user. Then, the data collection unit 210 performs pre-processing necessary for the received data.

In this case, the collected multidimensional data may include age, gender, smoking status, white blood cell count, and glutamic pyruvic transaminase (GPT) data of a person, which are used to measure oxidative stress.

In addition, the multidimensional data may include gender, body mass index (BMI), triglyceride level, high-density lipoprotein cholesterol index, and blood sugar level data of a person, which are used to measure metabolic stress.

In addition, the multidimensional data may include genomic, transcriptome, proteomic, and intestinal microbiome data, which are used to measure a multi-omics score.

In this way, it is possible to collect multidimensional data on a health status and to calculate values on individual items indicating a health status of each user, such as oxidative stress or metabolic stress, therefrom.

In addition, the data collection unit 210 classifies each pieces of the collected data according to properties of the data and transmits the divided data to each deep neural network model. For example, when integrally receiving age, gender, smoking status, white blood cell count, GPT, body mass index, triglyceride level, high-density lipoprotein cholesterol index, and so on of a person, the data collection unit 210 divides the data into a deep neural network model for processing oxidative stress and a deep neural network model for processing metabolic stress according to properties of the data and transmits the divided data.

An ordinal regression deep neural network model may the first ordinal regression deep neural network model 220 for outputting a first health status value based on multidimensional data of a first group and the second ordinal regression deep neural network model 230 for outputting a second health status value based on multidimensional data of a second group. In this case, the multidimensional data of the first group may include data used to measure oxidative stress, and the multidimensional data of the second group may include data used to measure metabolic stress.

In addition, as illustrated in FIG. 3, an ordinal regression deep neural network model may the first ordinal regression deep neural network model 220 for outputting the first health status value based on the multidimensional data of the first group, the second ordinal regression deep neural network model 230 for outputting the second health status value based on the multidimensional data of the second group, and a third ordinal regression deep neural network model 240 for outputting a third health status value based on multidimensional data of a third group.

A specific configuration of the respective ordinal regression deep neural network models will be described.

Figure 4:
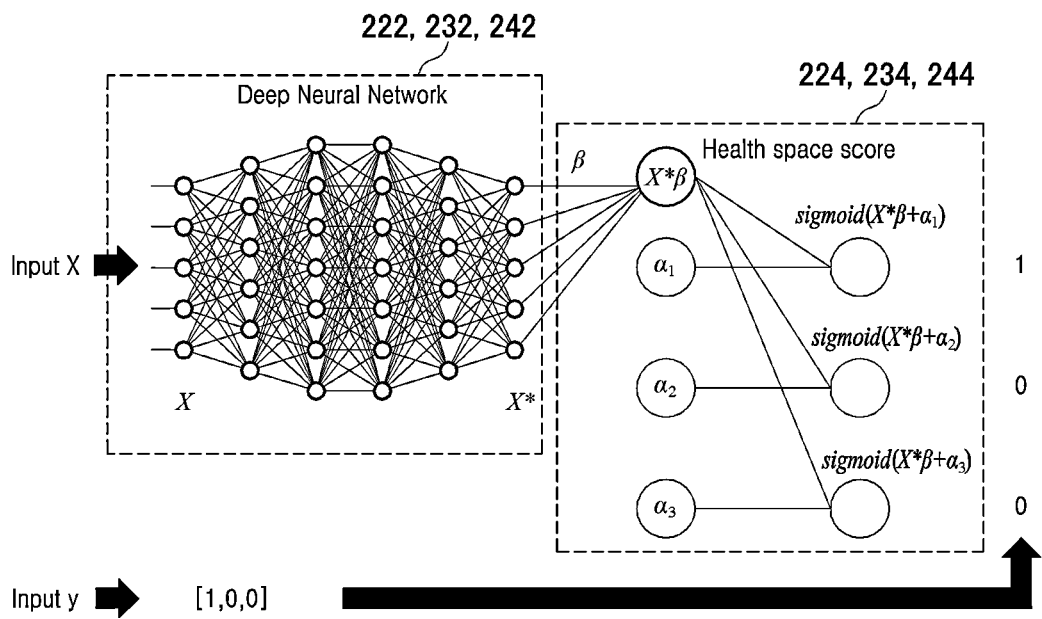
FIG. 4 is a diagram illustrating a configuration of an ordinal regression deep neural network model according to an embodiment of the present disclosure.

FIG. 4 is a diagram illustrating a configuration of an ordinal regression deep neural network model according to an embodiment of the present disclosure.

The first ordinal regression deep neural network models 220 may include a deep neural network 222 trained based on multidimensional data of each individual and label values indicating a health status of each individual and a classifier 224 that converts an output of the deep neural network 222 into a scalar value and divides the health status of each individual into k pieces (k is a plural natural number) based on the converted scalar value. In this case, the classifier 224 classifies a plurality of health statuses according to an ordinal regression analysis technique and outputs the classified result as an output of the deep neural network model. In this case, the ordinal regression analysis technique is to analyze a relationship between an independent variable and a dependent variable, and in particular, the dependent variable having an order is output. In the present disclosure, the ordinal regression analysis technique is used to sequentially classify a plurality of health statuses depending on their degrees.

For example, the first ordinal regression deep neural network model 220 includes the deep neural network 222 trained based on the multidimensional data for the first group of each individual and label values indicating a health status of each individual and the classifier 224 that converts an output of the deep neural network 222 into a scalar value and divides the health status of each individual into k pieces (k is a plural natural number) based on the converted scalar value. In this case, the classifier 224 multiplies an output of the deep neural network by a vector representing a sharing coefficient and outputs a first health status value converted into a scalar value. Then, the classifier 224 classifies health statuses according to an ordinal regression analysis technique.

In addition, the second ordinal regression deep neural network model 230 includes the deep neural network 232 trained based on the multidimensional data for the second group of each individual and label values indicating a health status of each individual and the classifier 234 that converts an output of the deep neural network 232 into a scalar value and divides the health status of each individual into k pieces (k is a plural natural number) based on the converted scalar value. In this case, the classifier 234 multiplies an output of the deep neural network by a vector representing a sharing coefficient and outputs a second health status value converted into a scalar value. Then, the classifier 234 classifies health statuses according to an ordinal regression analysis technique.

In addition, the third ordinal regression deep neural network model 240 includes the deep neural network 242 trained based on the multidimensional data for the third group of each individual and label values indicating a health status of each individual and the classifier 244 that converts an output of the deep neural network 242 into a scalar value and divides the health status of each individual into k pieces (k is a plural natural number) based on the converted scalar value. In this case, the classifier 244 multiplies an output of the deep neural network by a vector representing a sharing coefficient and outputs a third health status value converted into a scalar value. Then, the classifier 244 classifies health statuses according to an ordinal regression analysis technique.

The present disclosure uses a deep neural network, which makes it possible to find a complex relationship between an independent variable and a dependent variable through a function of approximating all functions by using an activation function such as 'relu'. In addition, various application cases utilizing a binary classification function of the deep neural network are known, but, as in the present disclosure, the case of applying ordinal regression to a health space model is not known.

The deep neural networks 222, 232, and 242 receive input data and cause the input data to be transferred to a plurality of layers, and according to an output of the activation function included in the classifiers 224, 234, and 244, weights of each layer are trained to be updated repeatedly. This allows a complex relationship between an independent variable (input data X) and a latent variable (output data X*) to be explored. In the last layer, a vector representing the output data (X*) is multiplied by a vector representing a sharing coefficient ($\beta$) to output a scalar value, which is used as a health space score. In addition, respective health status values are summed with k−1 intercepts (α1, α2, . . . , αk−1) used to classify health statuses, and this value is converted into a probability of belonging to each health status classification by a sigmoid function.

Here, k represents the number of health statuses, for example, the health statues may be classified as four health statuses (0: healthy status, 1: normal status, 2: slightly dangerous status, 3: disease status, k=4) based on oxidative stress, and three intercepts are required therefor. The respective statuses may be classified based on the intercepts, and thus, only k−1 intercepts are required.

Meanwhile, each health status may be changed into a three-dimensional vector. For example, each status may be represented as a healthy status (0=[0,0,0]), a normal status (1=[0,0,1]), a slightly dangerous status (2=[0,1,1]), and a disease status (3=[1,1,1]). Information on such health status is labeled in a state matched with multidimensional data of each user to be used in the process of learning the deep neural networks 222, 232, and 242. For example, in the learning process, a first vector value indicating a health status of a user and multidimensional data of a first group indicating oxidative stress for each user are labeled together to be used as learning data, and a second vector value indicating a health status of a user and multidimensional data of a second group indicating metabolic stress of the user are labeled together to be used as learning data.

In this way, the classifiers 224, 234, and 244 are optimized as classifiers that classify k health statuses by using input data X and labeling data y as learning data. In this case, the optimization of the classifiers 224, 234, and 244 indicates that calculation of the health status value (X*β) in the corresponding network is optimized.

When new input data is input to the respective deep neural network models 220, 230, and 240 of which learning is completed, the respective classifiers 224, 234, and 244 calculate the health status value (X*β), and calculate probability of belonging to a health status classification based on this. Meanwhile, in the visualization process, visualization is performed based on the health status value (X*β).

The classifiers 224, 234, and 244 update weighted values of the deep neural networks 222, 232, and 242 based on an output of a loss function, and in this case, the loss function may include a cross entropy loss function or a softmax loss function.

Next, the visualization module 250 displays the health status of each individual on a two-dimensional graph or a three-dimensional graph based on output values of each of the ordinal regression deep neural network models 220 to 240. Classification results output from the respective ordinal regression deep neural network models are output as ordinary numerical values of ordinal meaning indicating the health status, and the results are displayed to correspond to each axis. In this case, the visualization module 250 performs visualization based on the health status values previously output from the classifiers 224, 234, and 244. Two or three health status values are output by two or three deep neural network models, and thus, a two-dimensional graph or a three-dimensional graph may be displayed based thereon.

Figure 6:
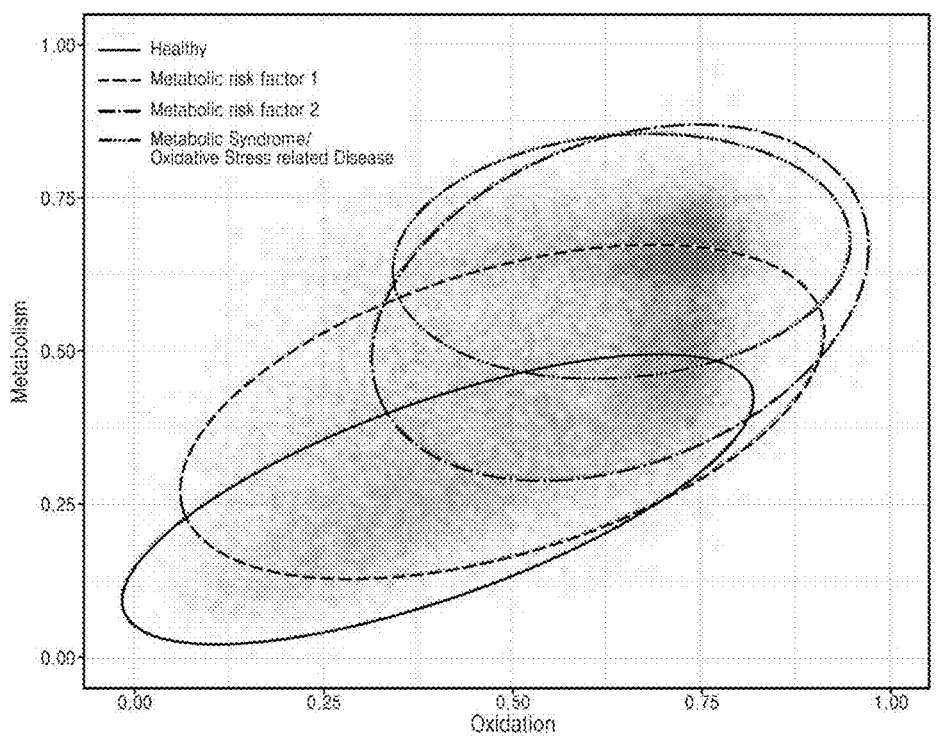
FIG. 6 is a graph illustrating a visualization result according to an embodiment of the present disclosure.

FIG. 6 is a graph illustrating a visualization result according to an embodiment of the present disclosure.

The visualization module 250 may display a result inferred by the first ordinal regression deep neural network model 220 and a result inferred by the second ordinal regression deep neural network model 230 to respectively correspond to a Y axis and an X axis, and thus, a health status of each individual may be displayed on a two-dimensional graph.

In addition, although not illustrated, the visualization module 250 may display the result inferred by the first ordinal regression deep neural network model 220, the result inferred by the second ordinal regression deep neural network model 230, and a result inferred by the third ordinal regression deep neural network model 240 to respectively correspond to the X axis, the Y axis, and a Z axis, and thus, the health status of each individual may be displayed on a three-dimensional graph.

Figure 5:
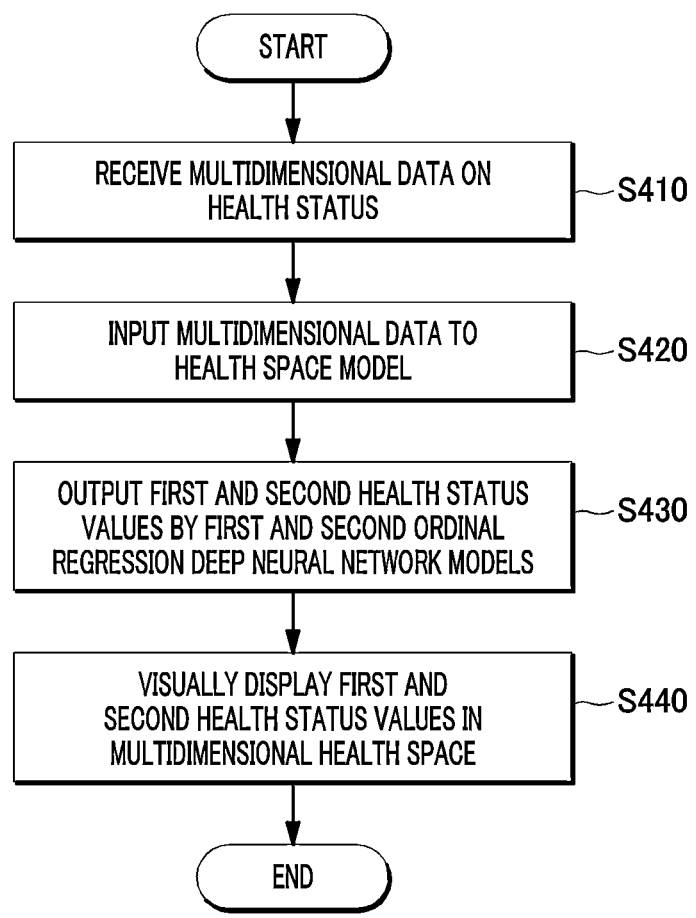
FIG. 5 is a flowchart illustrating a method of visualizing health status information using a health space model, according to an embodiment of the present disclosure.

FIG. 5 is a flowchart illustrating a method of visualizing health status information by using a health space model, according to an embodiment of the present disclosure.

This method assumes that a learning model constructing step for the health space model described above are completed.

First, multidimensional data on a health status of a target person is received (S410).

In this case, the received multidimensional data is data on a target person whose health status needs to be checked and includes information on metabolic stress or oxidative stress as described above. The multidimensional data received in this way is classified according to properties of respective data.

Next, the multidimensional data on the health status is input to a health space model (S420).

For example, when integrally receiving age, gender, smoking status, white blood cell count, GPT, body mass index, triglyceride level, high-density lipoprotein cholesterol index, and so on of a person, the data collection unit 210 divides the data into a deep neural network model for processing oxidative stress and a deep neural network model for processing metabolic stress according to properties of the data and transmits the divided data for each model.

Next, a first health status value is output as an output of multidimensional data of a first group by the first ordinal regression deep neural network model, and a second health status value is output as an output of multidimensional data of a second group by the second ordinal regression deep neural network model (S430).

As described above, the respective ordinal regression deep neural network models may perform learning by labeling input multidimensional data and health status values matched thereto and output results on health status by classifying oxidative stress and metabolic stress.

That is, multidimensional data of the first group may include age, gender, smoking status, white blood cell count, and GPT data of a person, which are used to measure oxidative stress, and the first ordinal regression deep neural network model may be constructed to output a first health status value indicating oxidative stress of a person. In addition, multidimensional data of the second group may include gender, BMI, triglyceride level, high-density lipoprotein cholesterol index, and blood sugar level data of a person, which are used to measure metabolic stress, and the second ordinal regression deep neural network model may be constructed to output a second health status value indicating metabolic stress of a person.

Next, a visualization step of displaying the first health status value corresponding to a first axis and displaying the second health status value corresponding to a second axis is performed (S440).

According to the visualization step, status information of each individual may be easily checked in the graph of the form illustrated in FIG. 6.

In this case, a third health status value may be output as an output on multidimensional data of a third group by the third ordinal regression deep neural network model, and the third health status value may be displayed to correspond to a third axis, and thereby, visualization in a three-dimensional form may be provided. As described above, a health status of each individual may be displayed in an easy-to-understand manner by outputting two or three representative items used to measure a health status of a person and visualizing the representative items.

According to the present application, health status information of a user may be extracted by an ordinal regression deep neural network model, and thus, each health status may be more clearly distinguished.

In addition, a health status of each individual may be displayed in an easy-to-understand manner by outputting two or three representative items used to measure a health status of a person and visualizing the representative items.

An embodiment of the present disclosure may be implemented in the form of a recording medium including instructions executable by a computer, such as a program module executed by the computer. A computer-readable recording medium may be any available medium that may be accessed by a computer and include both volatile and non-volatile media and removable and non-removable media. In addition, the computer-readable recording medium may include a computer storage medium. The computer storage medium includes both volatile and non-volatile media and removable and non-removable media implemented by any method or technology for storing information such as computer readable instructions, data structures, program modules, or other data.

Although the method and system according to the present disclosure are described with reference to some embodiments, some or all of components or operations thereof may be implemented by using a computer system having a general purpose hardware architecture.

The above descriptions on the present application are examples, and those skilled in the art to which the present application belongs may understand that the examples may be easily modified into other specific forms without changing the technical idea or essential features of the present application. Therefore, it should be understood that the embodiments described above are illustrative in all respects and not restrictive. For example, each component described as a single type may be implemented in a distributed form, and likewise components described in the distributed form may be implemented in a combined form.

The scope of the present application is indicated by the following claims rather than the detailed description made above, and all changes or modifications derived from the meaning and scope of the claims and their equivalent concepts should be interpreted as being included in the scope of the present application.

What is claimed is:

1. An apparatus for visualizing a health status information of each individual by using a health space model, the apparatus comprising:
   a processor; and
   a memory coupled to the processor and storing a health status information visualization program;
   wherein, when executed by the processor, the health status information visualization program inputs multidimensional data on a health status of a target person to the health space model to visually display a position of each individual in a two-dimensional health space,
   wherein the health space model includes a first ordinal regression deep neural network model for outputting a first health status value based on multidimensional data of a first group and a second ordinal regression deep neural network model for outputting a second health status value based on multidimensional data of a second group, and
   the health status information visualization program displays the health status information of each individual in a two-dimensional health space by causing the first health status value to correspond to a first axis and the second health status value to correspond to a second axis,
   wherein the first health status value indicates oxidative stress of the target person and the second health status value indicates metabolic stress of the target person.

2. The apparatus of claim 1, wherein
   the health space model further includes a third ordinal regression deep neural network model for outputting a third health status value based on multidimensional data of a third group, and
   the health space model visually displays the position of each individual in a three-dimensional space based on the first to third health status values.

3. The apparatus of claim 1, wherein
   the multidimensional data of the first group includes age, gender smoking status, white blood cell count, and glutamic pyruvic transaminase (GPT) data of the target person, which are used to measure the oxidative stress of at least the target person,
   the first ordinal regression deep neural network model outputs the first health status value indicating the oxidative stress of at least the target person,
   the multidimensional data of the second group includes gender, body mass index (BMI), triglyceride level, high-density lipoprotein cholesterol index, and blood sugar level data of the person, which are used to measure the metabolic stress of at least the target person, and
   the second ordinal regression deep neural network model outputs the second health status value indicating metabolic stress of at least the target person.

4. The apparatus of claim 1, wherein
   the first ordinal regression deep neural network model includes a deep neural network trained based on the multidimensional data of the first group for each individual and label values indicating the health status of each individual, and a classifier for dividing health status of each individual into k pieces (k is a plural natural number) based on the first health status value converted into a scalar value by multiplying an output of the deep neural network by a vector indicating a sharing coefficient,
   the classifier classifies health statuses according to an ordinal regression analysis technique,
   the second ordinal regression deep neural network model includes a deep neural network trained based on the multidimensional data of the second group for each individual and the label values indicating the health status of each individual, and a classifier for dividing the health status of each individual into k pieces (k is a plural natural number) based on the second health status value converted into a scalar value by multiplying an output of the deep neural network by a vector indicating a sharing coefficient, and
   the classifier classifies health statuses according to the ordinal regression analysis technique.

5. The apparatus of claim 4, wherein the classifier divides the health status into the k pieces based on k−1 values obtained by adding k−1 different intercept values to the values converted into the scalar value.

6. A method of visualizing health status information by using an apparatus for visualizing health status information, the method comprising:
- receiving multi-dimensional data on a health status of a target person;
- inputting the received multidimensional data on the health status to a health space model;
- outputting a first health status value as an output for multidimensional data of a first group by a first ordinal regression deep neural network model included in the health space model, and outputting a second health status value as an output for multidimensional data of a second group by a second ordinal regression deep neural network model; and
- displaying the first health status value corresponding to a first axis and the second health status value corresponding to a second axis,
- wherein the first health status value indicates oxidative stress of the target person and the second health status value indicates metabolic stress of the target person.

7. The method of claim 6, wherein
the outputting further includes outputting a third health status value as an output for multidimensional data of a third group by a third ordinal regression deep neural network model included in the health space model, and
the displaying includes displaying the third health status value corresponding to a third axis.

8. The method of claim 6, wherein
the multidimensional data of the first group includes age, gender, smoking status, white blood cell count, and glutamic pyruvictransaminase (GPT) data of the target person, which are used to measure the oxidative stress of at least the target person,
the first ordinal regression deep neural network model outputs the first health status value indicating the oxidative stress of at least the target person,
the multidimensional data of the second group includes gender, body mass index (BMI), triglyceride level, high-density lipoprotein cholesterol index, and blood sugar level data of the person, which are used to measure the metabolic stress of at least the target person, and
the second ordinal regression deep neural network model outputs the second health status value indicating the metabolic stress of at least the target person.

9. The method of claim 6, wherein
the first ordinal regression deep neural network model includes a deep neural network trained based on the multidimensional data of the first group for each individual and label values indicating the health status of each individual, and a classifier for dividing the health status of each individual into k pieces (k is a plural natural number) based on the first health status value converted into a scalar value by multiplying an output of the deep neural network by a vector indicating a sharing coefficient,
the classifier classifies health statuses according to an ordinal regression analysis technique,
the second ordinal regression deep neural network model includes a deep neural network trained based on the multidimensional data of the second group for each individual and the label values indicating the health status of each individual, and a classifier for dividing the health status of each individual into k pieces (k is a plural natural number) based on the second health status value converted into a scalar value by multiplying an output of the deep neural network by a vector indicating a sharing coefficient, and
the classifier classifies health statuses according to the ordinal regression analysis technique.

10. The method of claim 9, wherein the classifier divides the health status into the k pieces based on k−1 values obtained by adding k−1 different intercept values to the values converted into the scalar value.

* * * * *